(12) United States Patent
Kerman (10) Patent No.: US 10,942,804 B2
(45) Date of Patent: Mar. 9, 2021

(54) PHYSICAL-LAYER QUANTUM ERROR SUPPRESSION FOR SUPERCONDUCTING QUBITS IN QUANTUM COMPUTATION AND OPTIMIZATION

(71) Applicant: Massachusetts Institute of Technology, Cambridge, MA (US)

(72) Inventor: Andrew J. Kerman, Arlington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 274 days.

(21) Appl. No.: 16/276,100

(22) Filed: Feb. 14, 2019

(65) Prior Publication Data

US 2020/0394101 A1    Dec. 17, 2020

Related U.S. Application Data

(60) Provisional application No. 62/647,097, filed on Mar. 23, 2018.

(51) Int. Cl.
  *G11C 29/00* (2006.01)
  *G06F 11/10* (2006.01)
  *G06Q 10/00* (2012.01)

(52) U.S. Cl.
  CPC ......... *G06F 11/1068* (2013.01); *G06Q 10/00* (2013.01)

(58) Field of Classification Search
  CPC ........................... G06F 11/1068; G06Q 10/00
  See application file for complete search history.

(56) References Cited

U.S. PATENT DOCUMENTS

| | | |
|---|---|---|
| 2004/0000666 A1 | 1/2004 | Lidar et al. |
| 2012/0159272 A1 | 6/2012 | Pesetski et al. |
| 2015/0214984 A1 | 7/2015 | Ahn et al. |

FOREIGN PATENT DOCUMENTS

WO    WO-2016020648 A2 *    2/2016    ............. G06N 10/00

OTHER PUBLICATIONS

International Preliminary Report on Patentability dated Oct. 8, 2020 for International Application No. PCT/US2019/019528; 7 Pages.
(Continued)

*Primary Examiner* — Samir W Rizk
(74) *Attorney, Agent, or Firm* — Daly, Crowley, Mofford & Durkee LLP (57) ABSTRACT

A device combines physical qubits into a logical qubit according to a passive, quantum error-suppressing code, and weaves logical qubits into a fabric for performing computation or annealing according to an active, quantum error-correcting code. By using enough physical qubits in each logical qubit, the error suppression can overcome errors introduced by ambient noise, such as thermal fluctuations. However, interactions between individual logical qubits are based on interactions between multiple physical qubits, such as XX or ZZ interactions, so logical interactions require intermediary circuitry capable of coupling four or more spins-this circuitry also is described, wherein coupling an ancilla qubit to such intermediary circuitry allows the formation of a logical qubit having passive error suppression, and arbitrary computations can be performed using a fabric of such circuitry. Concatenating the active and passive codes does not increase circuit complexity, or reduce the speed of gate operations.

19 Claims, 9 Drawing Sheets

(56) References Cited

OTHER PUBLICATIONS

Kerman; "Advanced Quantum Annealing Hardware for Quantum Error Suppression"; Quantum Information and Integrated Nanosysterns Group; MIT Lincoln Laboratory; American Physical Society (APS) March Meeting; Mar. 5, 2018; Power Point Presentation; 33 pages.
Kerman; "Quantum Error Suppression with Superconducting Qubits"; Quantum Information and Integrated Nanosystems Group; MIT Lincoln Laboratory; Advanced Technology for National Security (ATNS) Meeting; Apr. 5, 2018; Power Point Presentation; 27 pages.
Kerman; "Quantum Information Processing Using Quasiclassical Electromagnetic Interactions Between Qubits and Electrical Resonators"; New Journal of Physics; vol. 15; (2013) 123011; Dec. 6, 2013; 30 pages.
Tomita, et al.; "Low-Distance Surface Codes Under Realistic Quantum Noise"; arXiv:1404.3747v3; May 2, 2014; 15 pages.
PCT International Search Report dated May 3, 2019 for International Application No. PCT/US2019/019528; 4 Pages.
PCT International Written Opinion dated May 3, 2019 for International Application No. PCT/US2019/019528; 10 Pages.
Bell et al.; "Spectroscopic Evidence of the Aharonov-Casher effect in a Cooper Pair Box"; arXiv:1504.05602v2; Mar. 15, 2016; pp. 1-6; 6 Pages.
de Graaf et al.; "Charge quantum interference device"; Nature Physics; vol. 14; Jun. 1, 2018; pp. 590-595; 6 Pages.
Friedman et al.; "Aharonov-Casher-Effect Suppression of Macroscopic Tunneling of Magnetic Flux"; arXiv:cond-mat/0109544v1; Sep. 28, 2001; pp. 1-9; 9 Pages.
Geberth et al.; "Stabilization of quantum information by combined dynamical decoupling and detected-jump error correction"; arXiv:0712.1480v1; Dec. 10, 2007; pp. 1-14; 14 Pages.
Jiang et al.; "Non-commuting two-local Hamiltonians for quantum error suppression"; arXiv:1511.01997v3; Feb. 18, 2017; doi:10.1007/s11128-017-1527-9; pp. 1-25; 25 Pages.
Jones; "Multilevel distillation of magic states for quantum computing"; arXiv:1210.3388v2; Mar. 27, 2013; pp. 1-10; 10 Pages.
Manucharyan et al.; "Evidence for coherent quantum phase-slips across a Josephson junction array"; arXiv:1012.1928v2; Jan. 11, 2012; pp. 1-18; 18 Pages.
Marvian et al.; "Error suppression for Hamiltonian-based quantum computation using subsystem codes"; APS Physics; Physical Review Letters 118; 030504; Jan. 20, 2017; 6 Pages.
Mishra et al.; "Performance of two different quantum annealing correction codes"; arXiv:1508.02785v2; Jan. 19, 2016; pp. 1-25; 25 Pages.
Pop et al.; "Experimental demonstration of Aharonov-Casher interference in a Josephson junction circuit"; arXiv:1104.3999v1; Apr. 20, 2011; pp. 1-8; 8 Pages.
Pudenz et al.; "Error-corrected quantum annealing with hundreds of qubits"; Nature Communications; 5:3243; DOI: 10.1038; Nov. 8, 2013; pp. 1-10; 10 Pages.
Pudenz et al.; "Quantum annealing correction for random lsing problems"; Physical Review A; 91; 042302; Jan. 1, 2015; American Physical Society; 15 Pages.
Rosenberg et al.; "3D integrated superconducting qubits"; Nature Partner Journals; Quantum Information; Oct. 9, 2017; 3:42; doi:10.1038/s41534-017-0044-0; pp. 1-5; 5 Pages.
Schondorf et al.; "Four-local interactions in a superconducting qubit architecture without ancilla qubits"; arXiv:1811.07683v1; Nov. 19, 2018; pp. 1-22; 22 Pages.
Vinci, et al.; "Nested quantum annealing correction"; Nature Partner Journals; Quantum Information; Aug. 2, 2016; 2; 16017; doi:10.1038/npjqi.2016.17; pp. 1-6; 6 Pages.
Vinci, et al.; "Quantum Annealing Correction with Minor Embedding"; arXiv:1507.02658v1; Jul. 9, 2015; pp. 1-34; 34 Pages.
Weber et al.; "Coherent Coupled Qubits for Quantum Annealing"; Physical Review Applied 8; 014004; Jul. 10, 2017; 13 Pages.
Yan et al.; "The Flux Qubit Revisited to Enhance Coherence and Reproducibility"; arXiv:1508.06299v4; Nov. 4, 2016; 55 Pages.

* cited by examiner

PHYSICAL-LAYER QUANTUM ERROR SUPPRESSION FOR SUPERCONDUCTING QUBITS IN QUANTUM COMPUTATION AND OPTIMIZATION

CROSS-REFERENCE TO RELATED APPLICATIONS

This application claims the benefit of U.S. Provisional Application 62/647,097, filed Mar. 23, 2018 and entitled "Physical-Layer Quantum Error Suppression for Superconducting Qubits in Gate Model Quantum Computation Applications", the entire contents of which are incorporated by reference herein.

GOVERNMENT LICENSE RIGHTS

This invention was made with government support under Grant No. FA8702-15-D-0001 awarded by the U.S. Air Force. The government has certain rights in the invention.

FIELD

The disclosure pertains generally to quantum information processing, and particularly to achieving usefully low qubit error rates.

BACKGROUND

Achieving quantum fault-tolerance is by far the single greatest challenge that stands in the way of most real-world applications for quantum information processing. Although enormous progress has been made across different physical qubit modalities in decreasing their physical error rates, even the most advanced demonstrations of protected or encoded qubits have still not yet reached error rates at the so-called threshold below which quantum error correction begins to become effective. Furthermore, since the physical resources needed to implement error correction increase at least exponentially as the error threshold is approached from below, one needs to achieve physical error rates well below this threshold before quantum error correction can have any hope of being useful.

Moreover, it is far from certain that lower error rates are achievable using leading physical qubit modalities such as superconducting Josephson circuits and trapped atomic ions. In both cases, the fundamental single and two-qubit gate operations are very highly developed and running up against fundamental limitations in their physical noise sources. For example, the coherence of superconducting circuits is known to be limited by lossy/noisy surface and/or interface layers associated with the superconducting metals used. Researchers have been trying to understand and limit these noise sources for nearly 30 years, and although there was substantial progress at first, the achievable coherence has essentially saturated in the last five years. While it is possible that this impasse might be broken with an industrial level of effort such as that which made modern semiconductor circuits possible, there is no specific evidence to suggest this will be the case, since the underlying microscopic noise mechanisms are still not completely understood.

SUMMARY OF DISCLOSED EMBODIMENTS

Disclosed embodiments use a layer of purely-passive quantum error suppression at the lowest level in superconducting circuits, before any active quantum error correction protocols are implemented. This has two important advantages. First, it enables existing superconducting qubit technology to achieve error rates sufficiently low to achieve quantum fault tolerance; and second, it "preconditions" the errors at the physical layer, removing structure and bias and allowing them to be corrected more efficiently. This latter point is important because the proof that fault-tolerance is even possible relies on highly idealized error models which are not representative of any real physical system, and preconditioning will likely make the noise remaining after the passive error suppression layer closer to these simplified models.

Thus, a first embodiment is a method of error suppression. The method includes, in a first level, encoding a quantum state of a logical qubit using a passive quantum error-suppressing code to generate an encoded quantum state. The method also includes, in a second level, encoding the encoded quantum state using an active quantum error-correcting code. Performing the encoding in the first level suppresses an effective error rate seen by the encoding in the second level.

In some embodiments, the passive quantum error-suppressing code comprises a code having distance two.

In some embodiments, the active quantum error-correcting code comprises a code having distance at least three.

In some embodiments, the logical qubit comprises a plurality of physical qubits, the method further comprising the plurality of physical qubits interacting according to check operators of the passive quantum error-suppressing code with a negative coefficient, whereby introduction of a logical error by local physical noise requires an environmental energy greater than the interaction strength between at least two physical qubits. In embodiments, the environment energy is an ambient noise energy, which may be a thermal noise energy.

Some embodiments further include the logical qubit interacting, in the first level, with each of a plurality of other logical qubits using a respective inductive coupling site, of the logical qubit, according to a four-physical-qubit operator.

In some such embodiments, each respective interacting comprises first coupling, to a multispin resonator, an inductive coupling site of the logical qubit; then coupling, to the multispin resonator, an inductive coupling site of a logical qubit in the plurality of other logical qubits; and then modulating the two inductive coupling sites according to a pulse.

Some such embodiments further include concatenating the logical qubit and the plurality of other logical qubits in the first level to form a logical qubit in the second level, wherein the active quantum error-correcting code in the second level is implemented by the modulations of the logical qubit interacting with the other logical qubits according to the suppressed effective error rate.

A second embodiment is a device comprising a logical qubit having a quantum state that has been encoded, in a first level, according to a passive quantum error-suppressing code to generate an encoded quantum state, the encoded quantum state having been further encoded, in a second level, according to an active quantum error-correcting code, wherein the encoding in the first level suppresses an effective error rate seen by the encoding in the second level.

In some embodiments, the passive quantum error-suppressing code comprises a code having distance two.

In some embodiments, the active quantum error-correcting code comprises a code having distance at least three.

In some embodiments, the logical qubit comprises a plurality of physical qubits interacting according to check operators of the passive quantum error-suppressing code with a negative coefficient, whereby introduction of a logical error by local physical noise requires an environmental energy greater than the interaction strength between at least two physical qubits.

Some embodiments further include a plurality of other logical qubits, wherein the logical qubit and each of the plurality of other logical qubits are coupled by respective inductive coupling sites.

In some such embodiments, the respective inductive coupling sites are modulated according to a pulse to cause the logical qubit and the respective other logical qubit to interact in the first level.

In some such embodiments, the logical qubit and the plurality of other logical qubits in the first level are concatenated to form a logical qubit in the second level, wherein the active quantum error-correcting code in the second level is implemented by the modulations of the logical qubit interacting with the other logical qubits according to the suppressed effective error rate.

A third embodiment is an error suppression device for a logical qubit. The error suppression device includes first means for encoding in a first level a quantum state of a logical qubit using a passive quantum error-suppressing code to generate an encoded quantum state. The error suppression device also includes second means for encoding in a second level the encoded quantum state using an active quantum error-correcting code. In the error suppression device, performing the encoding in the first level suppresses an effective error rate seen by the encoding in the second level.

In some embodiments, the passive quantum error-suppressing code comprises a code having distance two.

In some embodiments, the active quantum error-correcting code comprises a code having distance at least three.

In some embodiments, the logical qubit comprises a plurality of physical qubits, the device further comprising the plurality of physical qubits interacting according to check operators of the passive quantum error-suppressing code with a negative coefficient, whereby introduction of a logical error by local physical noise requires an environmental energy greater than the interaction strength between at least two physical qubits. In embodiments, the environment energy is ambient noise energy which may correspond to a thermal noise energy.

In some embodiments, the first means is provided as a logical qubit having a quantum state that has been encoded, in a first level, according to a passive quantum error-suppressing code to generate an encoded quantum state.

In some embodiments, the second means is provided as an active quantum error-correcting code, with the first and second means interacting such that the encoding in the first level suppresses an effective error rate seen by the encoding in the second level.

It is appreciated that repeating the concepts, techniques, and structures of the above-described embodiments allows formation of quantum circuitry for performing computations of arbitrary complexity while retaining the much loser physical error rates associated with passive error suppression.

DESCRIPTION OF THE SEVERAL VIEWS OF THE DRAWINGS

The manner and process of making and using the disclosed embodiments may be appreciated by reference to the drawings, in which.

DETAILED DESCRIPTION

Figure 1:
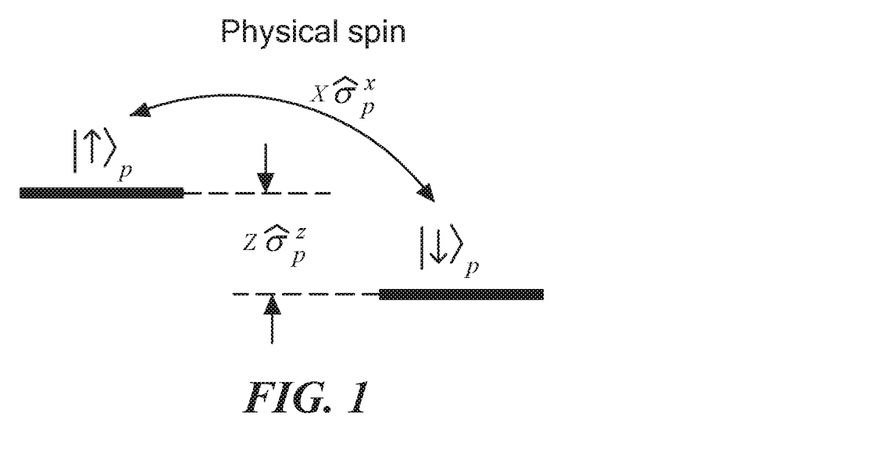
FIG. 1 schematically shows energy states of a physical qubit.
Figure 1A:
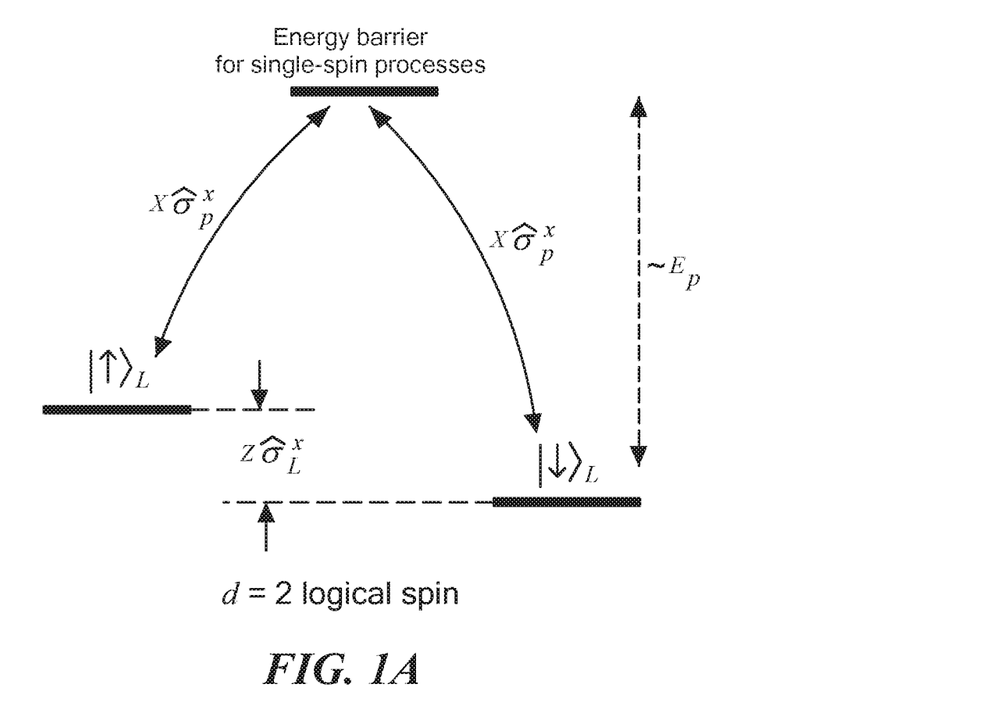
FIG. 1A schematically shows energy states of a logical qubit.

FIG. 1 schematically shows energy states of a physical qubit used to represent a spin-1/2. FIG. 1A shows the principle of passive quantum error suppression, in which the two physical spin states of FIG. 1 are replaces by encoded logical states of an assemblage of interacting physical qubits, such that an energy barrier occurs, for any single-qubit error process, between the two encoded logical qubits states. This energy barrier is made greater by increasing the interaction strength between physical qubits. As used herein, the "interaction strength" refers to the strength of the interactions engineered to be proportional to the negative of the check operators. If this barrier is made much greater than that available from any environmental source of noise (for example, thermal energy), it has the effect of passively suppressing any noise-induced transitions between logical states. This protection is passive because it does not require any active intervention from outside (as in quantum error correction); furthermore, if a physical error process does occur which takes the system onto the top of the barrier, a logical error will occur with probability ½ when the system decays back into the code space (since either logical state is equally likely after this occurs).

The above limitation associated with distance-2 is well known, and it is for this reason that active error correction methods always use codes with distance 3 or greater. Here we do the same, but we replace the physical qubits in a distance 3 (or greater) code with the passively protected distance-2 logical qubits described above. In this scheme, the passive error suppression is used to effectively reduce the physical error rate which enters the subsequent active quantum error-correction. That is, physical qubits are combined into logical qubits having an internal energy barrier between logical states, and these logical qubits participate in a higher-level fault-tolerance architecture. This is known as code "concatenation," except that here, unlike the conventional case, the lowest level of encoding involves purely static, passive error suppression rather than active error correction, and therefore does not increase the circuit complexity or reduce the speed of gate operations, as is the case in conventional code concatenation. Thus, the present scheme can be much simpler, faster, and more scalable.

Figure 1B:
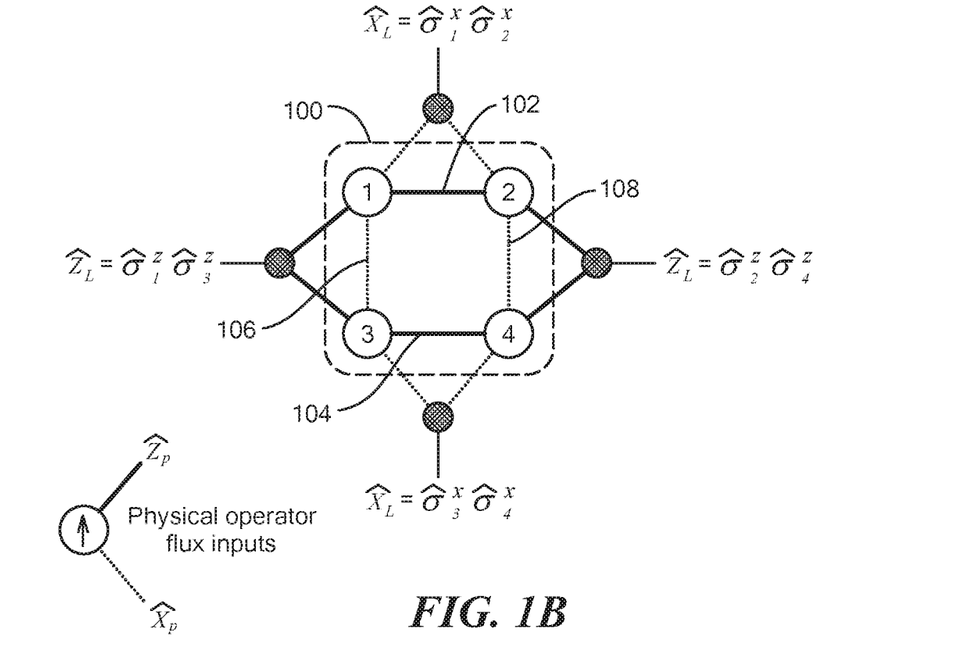
FIG. 1B schematically shows an embodiment of a logical qubit comprising four physical qubits and using a distance-2 Bacon-Shor code, whose encoding requires two-qubit physical couplings.
Figure 3:
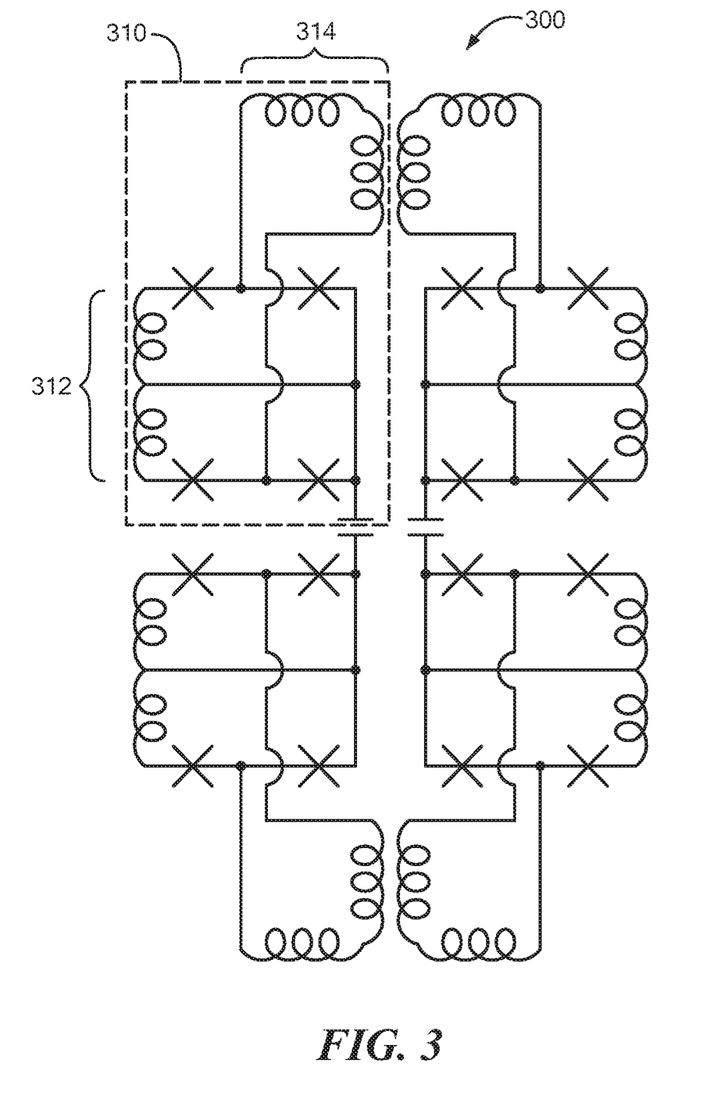
FIG. 3 shows an illustrative physical realization of the distance-2 Bacon-Shor logical qubit embodiment shown in FIG. 1B for passive quantum error suppression.

In this connection, FIG. 1B schematically shows an embodiment of a logical qubit 100 comprising four physical qubits based on a distance-2 Bacon-Shor code. The logical qubit 100 includes four physical qubits numbered 1 through 4. As illustrated in FIG. 3 in more detail, physical qubits 1 and 2 are coupled by a strong ZZ interaction using a two-qubit coupler 102, physical qubits 3 and 4 are coupled by a strong ZZ interaction using a two-qubit coupler 104, physical qubits 1 and 3 are coupled by a strong XX (or YY) interaction using a two-qubit coupler 106, and physical qubits 2 and 4 are coupled by a strong XX (or YY) interaction using a two-qubit coupler 108. This realizes the level structure shown in FIG. 1A.

Figure 1C:
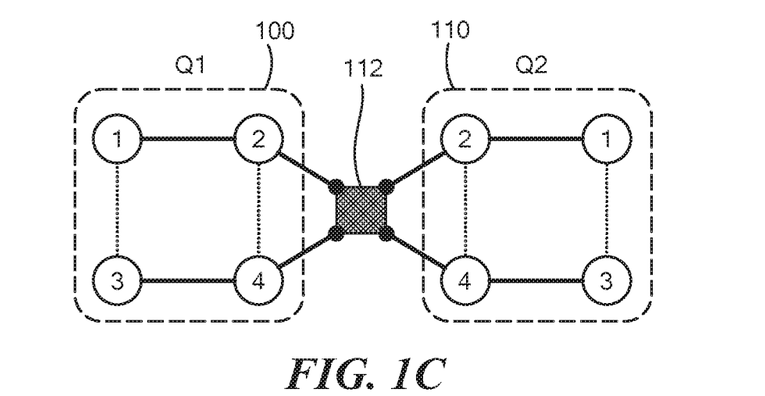
FIG. 1C schematically shows an embodiment of two such logical qubits coupled by a logical ZZ interaction, realized by a four-qubit physical coupling.

FIG. 1C schematically shows an embodiment of two such logical qubits 100 and 110 coupled by a (logical) ZZ interaction, via a four-qubit physical coupling 112. A physical realization of such an embodiment is shown in FIG. 3B, which can realize pulsed four-qubit interactions in conjunction with an extension of the methods described in "Quantum Information Processing Using Quasiclassical Electromagnetic Interactions Between Qubits and Electrical Resonators," Andrew J Kerman 2013 *New J. Phys.* 15 123011, hereinafter "Kerman2013", the entire contents of which are incorporated herein by reference. However, it is appreciated that other physical realizations may use 4-spin couplers 112 as described in U.S. application Ser. No. 15/976,291 filed 2018 May 10, multiloop couplers 112 as described in U.S. application Ser. No. 15/354,275 filed 2016 Nov. 17, or any other multi-qubit coupler 112 providing similar functionality. The entire contents of these Applications are incorporated herein by reference.

Figure 1D:
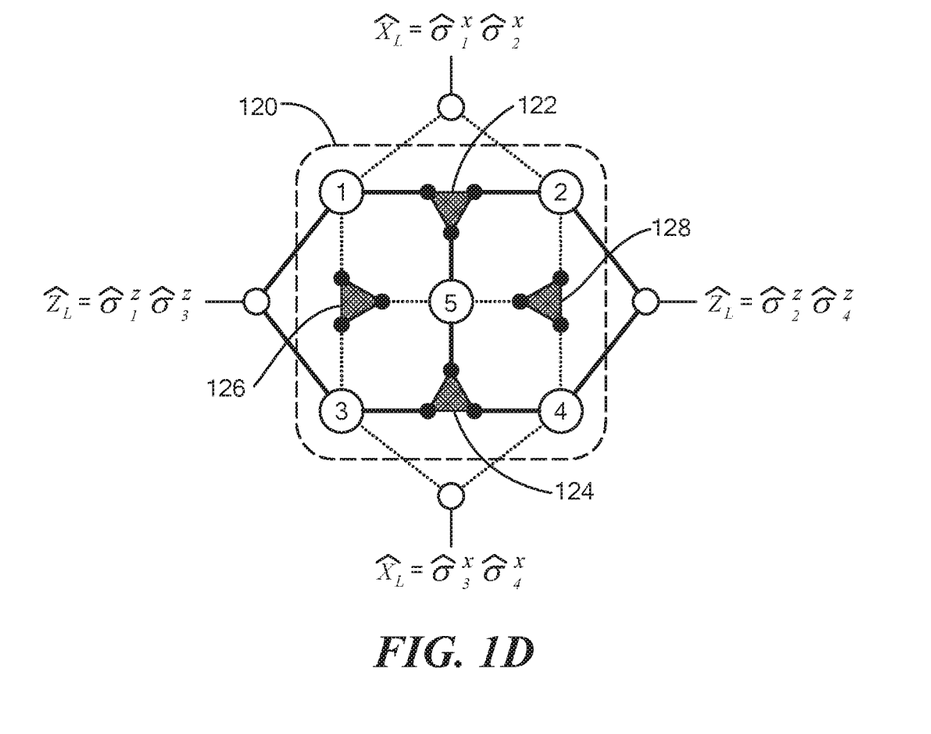
FIG. 1D schematically shows an embodiment of a logical qubit comprising five physical qubits using a distance-2 surface code, whose encoding requires three-qubit physical couplings.
Figure 1E:
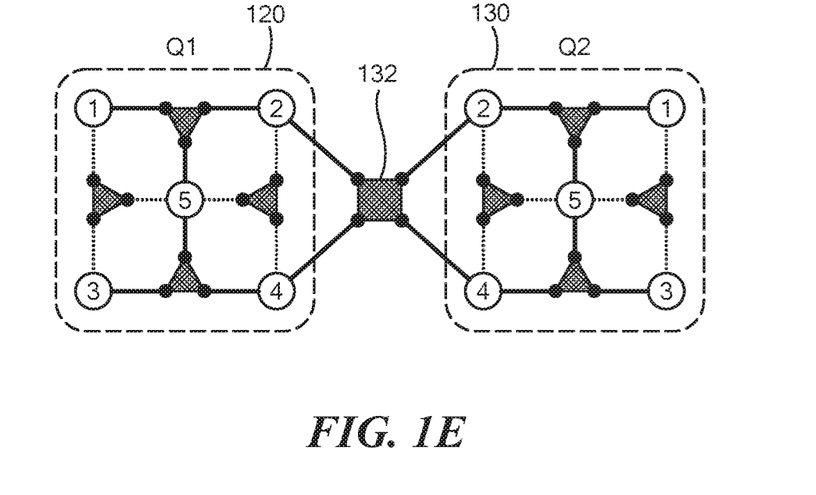
FIG. 1E schematically shows an embodiment of two distance-2 surface code logical qubits coupled by a logical ZZ interaction, realized by a four-qubit physical coupling.

Distance-2 Bacon-Shor codes are not the only way to implement quantum error suppression in accordance with the concepts disclosed herein. In this connection, FIG. 1D schematically shows an embodiment of a logical qubit 120 comprising five physical qubits based on a distance-2 surface code, where the internal interactions required are three-qubit physical couplings. Physical qubits 1, 2, and 5 of logical qubit 120 are coupled by a strong ZZZ interaction using a three-qubit coupler 122, while physical qubits 3, 4, and 5 are coupled by a strong ZZZ interaction using a three-qubit coupler 124. Likewise, physical qubits 1, 3, and 5 of logical qubit 120 are coupled by a strong XXX interaction using a three-qubit coupler 126 and physical qubits 2, 4, and 5 are coupled by a strong XXX interaction using a three-qubit coupler 128. FIG. 1E schematically shows an embodiment of two such logical qubits 120 and 130 coupled by a (logical) ZZ interaction again using a four-qubit physical coupling 132 that may be a pulsed operation as in Kerman2013, a 4-spin coupler, or a multiloop coupler as indicated in the above-referenced U.S. Applications.

The embodiments of FIGS. 1B and 1C have the advantage that the strong interactions internal to the distance-2 logical qubits, and which provide the error suppression, only require pairwise interactions between physical qubits. However, the embodiments of FIGS. 1D and 1E provide greater error suppression. Both sets of embodiments have 2-qubit logical operators, so both need 4-qubit physical interaction to implement a 2-qubit logical interaction. Of course, logical qubits according to the concepts and techniques taught herein may be implemented using other physical designs. For concreteness and not by way of limitation, the specification below focuses on the illustrative embodiments of FIGS. 1B and 1C, with the understanding that the techniques described are equally applicable to other physical realizations.

Figure 2:
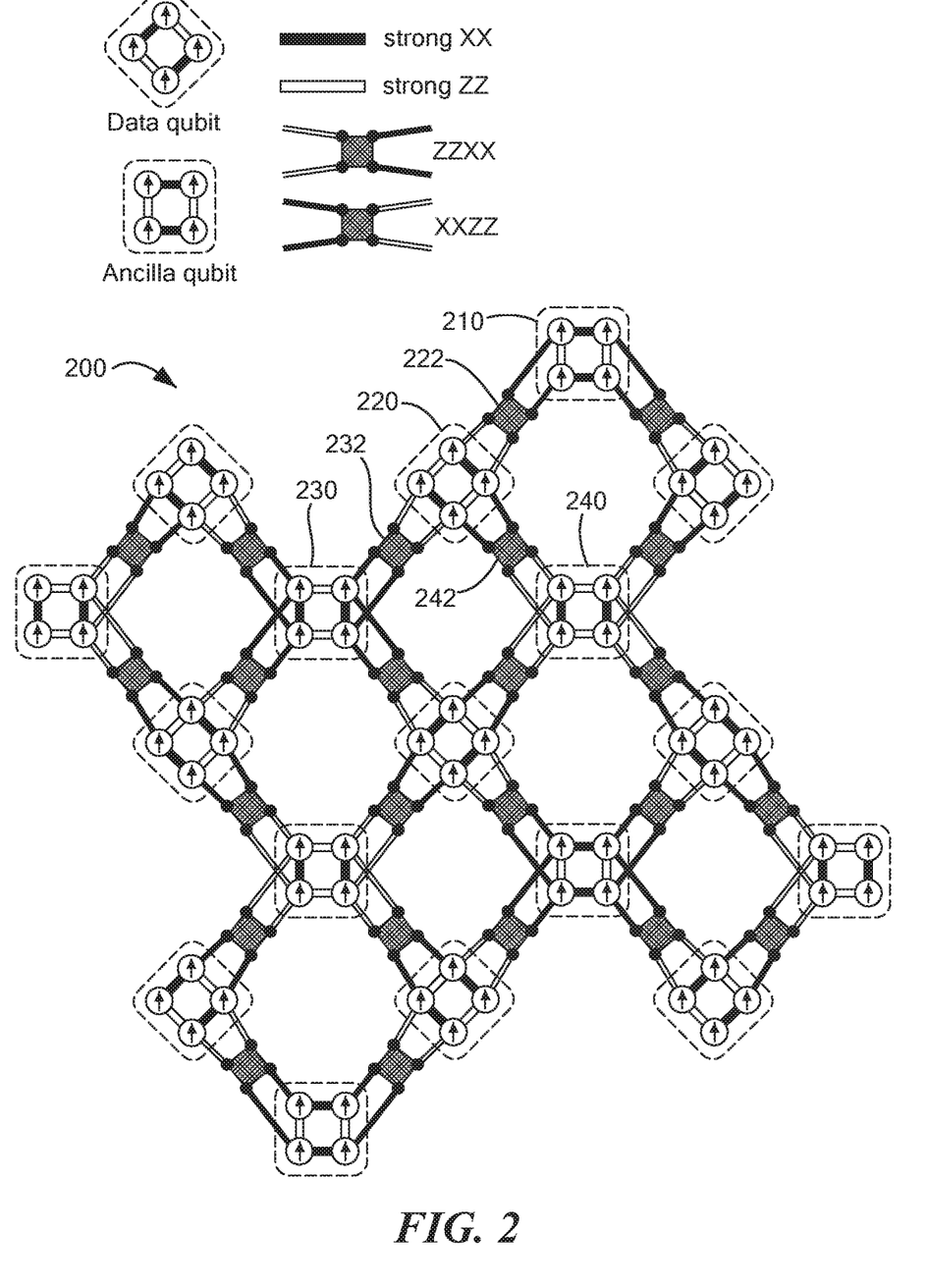
FIG. 2 schematically shows a distance-3 surface code logical qubit with physical-layer passive quantum error suppression based on the distance-2 Bacon-Shor code shown in FIGS. 1B and 1C.

FIG. 2 shows an example of how this passive quantum error suppression would be incorporated into an active quantum error correction scheme, where in this case the active error correction is based on a distance-3 surface code. What would normally be the physical qubits are replaced with protected distance-2 logical qubits (e.g., groups of four or more physical qubits), e.g. groups 210, 220, 230, and so on. Each such group 210, 220, 230 of physical qubits incorporates strong two-qubit energy penalties based, in this example, on a distance-2 Bacon-Shor code as in FIG. 1B.

To perform quantum error correction on this distance-3 surface code logical qubit requires the usual pairwise CNOT operations, but now on these composite 4-qubit objects consisting of four physical qubits each. The effective X and Z operators for these protected qubits are two-physical-qubit operators, ZZ and XX, respectively; so, interactions between them are four-qubit operators. In the case of a CNOT gate, they correspond to either XXZZ or ZZXX, depending on which is the control, and which is the target qubit. These four-physical qubit interactions are indicated in the figure by solid rectangles connected to four physical qubits. If performing the usual CNOT operations, these four-physical-qubit interactions would be pulsed on for half a period (that is, for a time equal to the Planck constant h divided by twice the 4-qubit interaction energy) and could be realized either with the methods of Kerman2013, or by explicit physical 4-qubit couplings as in the above-referenced U.S. Applications.

There are two major ingredients needed for realizing the above construction that have not been available in any physical qubit modality in the prior art. The first such ingredient is strong, static ZZ and XX interactions between qubits that do not require the presence of effective local fields (terms proportional to X, Y, or Z in the Hamiltonian which lift the degeneracy between the two physical qubit states). A basis for this functionality is the "Josephson phase-slip qubit" (JPSQ) described in U.S. Provisional Application 62/737,372. This device is specifically designed to have the property mentioned above, which is also of interest for several other areas in quantum information processing. A physical realization of this device is indicated in FIG. 3 and described below.

The second ingredient is a mechanism for implementing four-physical-qubit gate operations, which correspond to the two-logical qubit gates needed here to realize the surface code, that does not substantially interfere with the disclosed distance-2 error suppression by introducing any two-qubit interaction terms that correspond to the single-logical qubit stabilizers. This functionality can be realized using the multiqubit geometric phase gates described in Kerman2013. Alternatively, such operations could be realized by pulsing on an explicit four-qubit interaction based on the technologies described in the above referenced U.S. Applications.

FIG. 3 shows an illustrative physical realization of the logical qubit 300 embodiment shown in FIG. 1B. The logical qubit 300 includes four identical circuits in mirror image, of which circuit 310 is illustrative. Such a realization requires the use of qubits with true, vector spin-1/2 interactions at zero field offset. The physical properties of the circuit 310, which is a JPSQ, may be more fully appreciated by reference to the above-mentioned JPSQ Application. For purposes of the present disclosure, however, it suffices to note that the horizontal qubit connections are mutual inductances and correspond to ZZ interactions between the two horizontal qubit pairs. The vertical connections are capacitive and correspond to effective YY interactions between the two vertical qubit pairs. These four physical qubits coupled in this manner implement the Bacon-Shor logical qubit of FIG. 1B. The design includes a site 312 for use in XX interactions, and a site 314 for use in ZZ interactions. Note that the YY interactions between the vertical qubit pairs shown here are interchangeable with the above-mentioned XX interactions, for the purposes of realizing quantum error suppression using the distance-2 Bacon-Shor code.

Figure 3A:
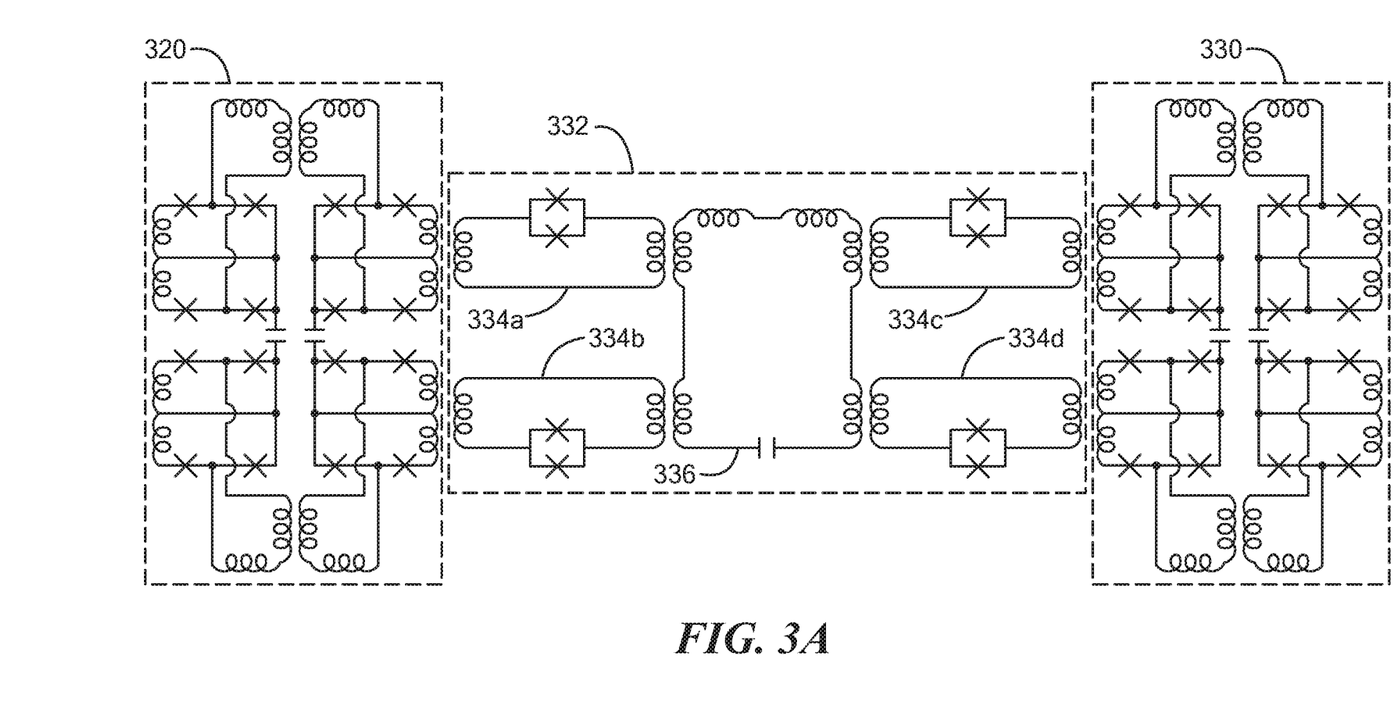
FIG. 3A shows an illustrative physical realization of two such logical qubits coupled by a logical ZZ interaction using a pulsed four-qubit physical coupling based on geometric phase gates.
Figure 3B:
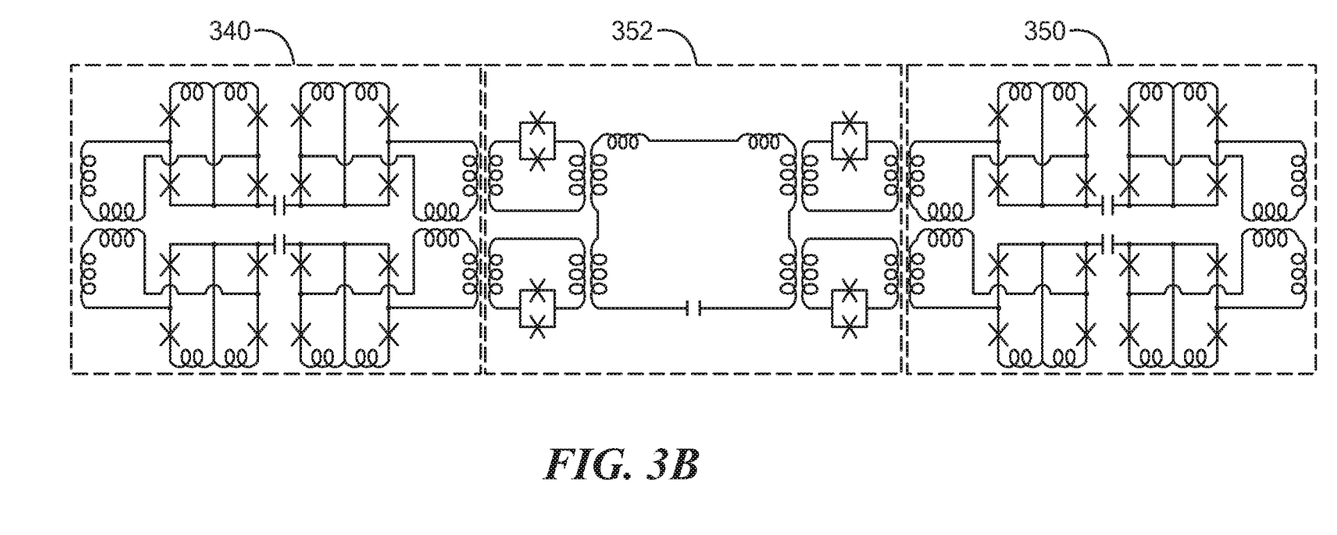
FIG. 3B shows an illustrative physical realization of two logical qubits coupled by logical XX interaction using a pulsed four-qubit physical coupling based on geometric phase gates.

FIGS. 3A and 3B, respectively, show circuits designed to implement the four-physical-qubit gate operations that correspond to logical XX and ZZ gates. In FIG. 3A, for example, the physical qubit loops corresponding to X operators for four of the JPSQs, in two logical qubits 320 and 330, are coupled via a circuit 332 having tunable couplers 334a-334d and a single resonator 336. According to the methods of Kerman2013, if these couplers 334a-334d are modulated at a frequency near resonance with the resonator 336, a geometric phase accumulates which is dependent on the state of the corresponding four physical qubits along the X axis. If the modulation is turned off at the correct time, this geometric phase is mapped purely on the qubits' state, creating the four-qubit XXXX interaction that corresponds to a logical XX interaction. Similarly, FIG. 3B gives the equivalent circuit for the physical ZZZZ interaction corresponding to logical ZZ between qubits 340 and 350 using a tunable coupling circuit 352.

Figure 3C:
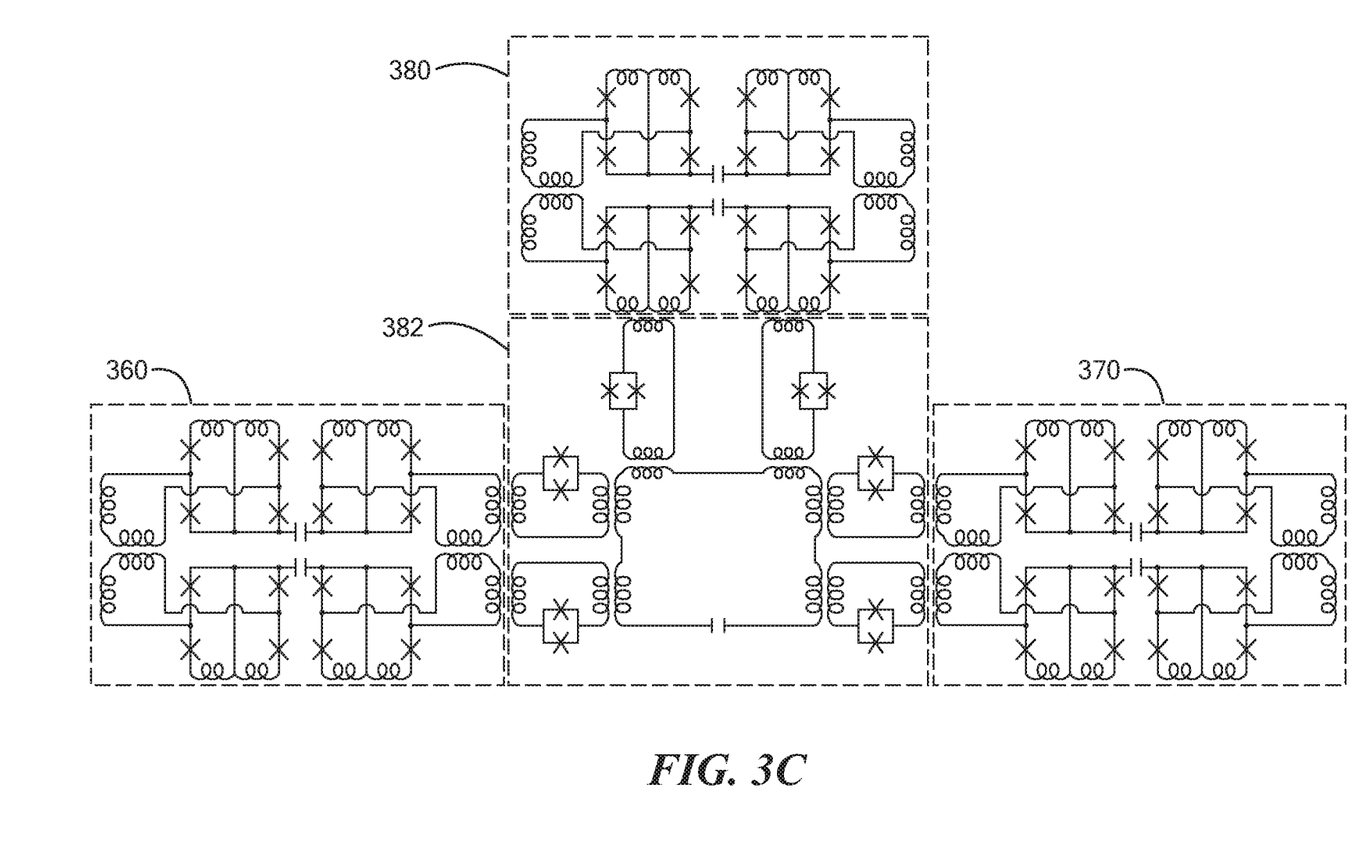
FIG. 3C shows an illustrative physical realization of two distance-2 data qubits coupled to a distance-2 ancilla qubit by pulsed ZZXX interactions.

FIG. 3C shows an illustrative physical realization of two logical data qubits 360 and 370 coupled to an ancilla qubit 380 via a tunable coupling circuit 382 for a ZZXX interaction. By modulating the four couplers shared by the ancilla qubit 380 with one or the other of the two data qubits 360 and 370, a CNOT gate can be implemented between the ancilla qubit 380 and the qubit 360 or 370, without affecting the third, bystander data qubit (370 or 360, respectively). This capability is the foundation for the physical realization shown in FIG. 4 and discussed below.

A crucial element of this scheme is that it involves no direct pairwise interaction between physical qubits, other than those which realize the error suppression. This means that to leading order, there is no mechanism by which environmental fluctuations can couple directly to the logical variables of the protected qubits. That is, the logical CNOT gates between protected qubits are realized in a manner that does not introduce any additional coupling between the environment and the logical operators of the protected qubits, thus preserving the error suppression even in the presence of two-logical-qubit gate operations.

Figure 4:
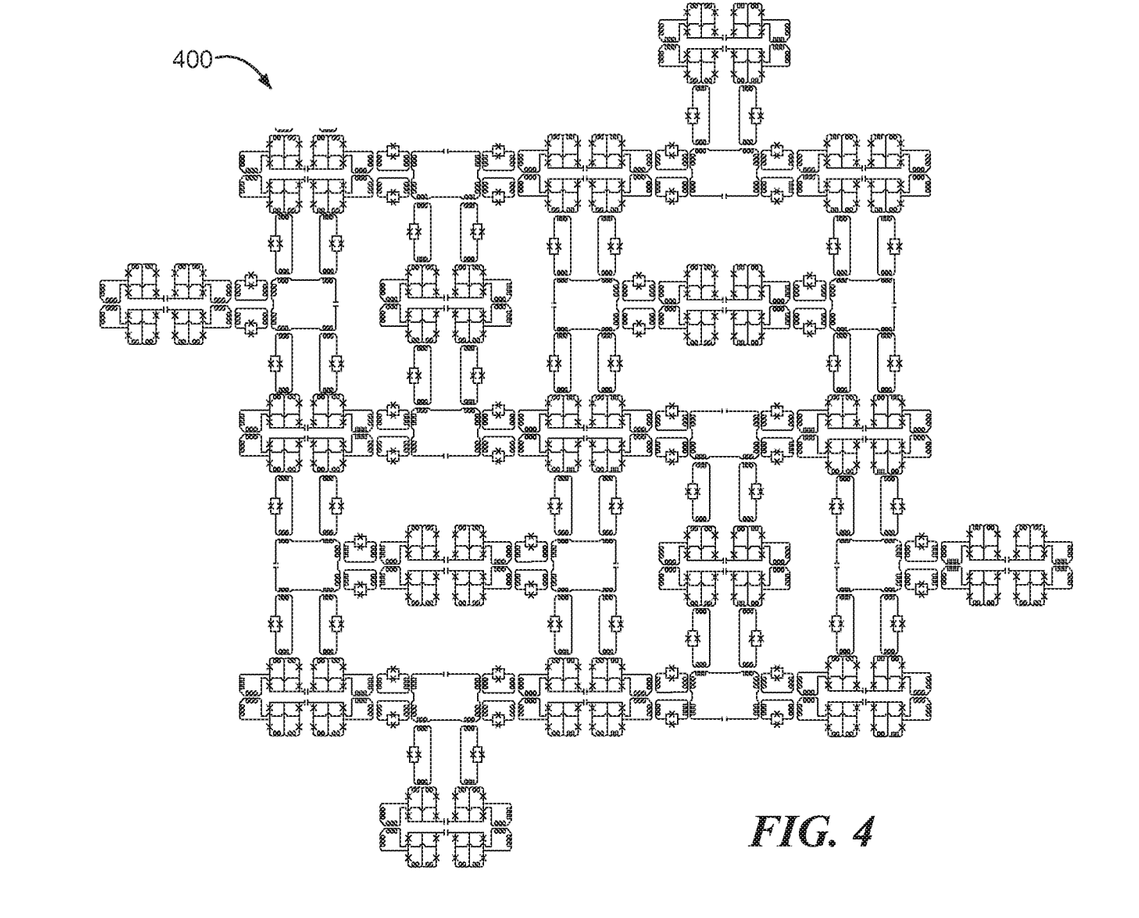
FIG. 4 shows an illustrative physical realization of the logical qubit embodiment shown in FIG. 2, built out of the components shows in FIGS. 3-3C.

FIG. 4 shows an example of how this concept can be extended to a full, distance-3 surface-code logical qubit 400: the so-called "surf-17" proposed by Tomita and Svore.

Although a construction like that shown in FIG. 4 appears to increase the resources needed to implement a logical qubit (compared to the conventional method with physical qubits at the lowest level), in fact it may vastly decrease the resources required to achieve a given logical error rate. The quantum threshold theorem, roughly speaking, states that if the physical error rate is below the threshold value then it is always possible to achieve a desired logical error rate; however, the resources needed to do this (in both physical hardware and computation run time) increase at least exponentially as the ratio of the physical error rate to the logical error rate approaches 1 from below. So, any reduction in the effective physical error rate results in a super-exponential reduction in the required resources.

What the scheme disclosed herein effectively does is replace the bare physical qubit error rate of the conventional scheme with the much lower one that can be achieved using the disclosed, purely-passive, distance-2 error suppression. Although this requires more complex circuits to implement, as shown in FIG. 4, the code blocks needed to achieve a given logical error rate will be smaller by an exponential factor compared to the conventional method. For example, using physical qubits one might need a distance-30 surface code block to achieve a certain error rate (consisting of roughly ~1000 data qubits plus ~1000 ancilla qubits), while using the disclosed method one might need only distance-3 (consisting of 9 protected data qubits plus 8 protected ancilla qubits=17 protected qubits=68 physical qubits).

In the foregoing detailed description, various features of the invention are grouped together in one or more individual embodiments to streamline the disclosure. This method of disclosure is not to be interpreted as reflecting an intention that the claimed invention requires more features than are expressly recited in each claim. Rather, inventive aspects may lie in less than all features of each disclosed embodiment.

Having described implementations which serve to illustrate various concepts, structures, and techniques which are the subject of this disclosure, it will now become apparent to those of ordinary skill in the art that other implementations incorporating these concepts, structures, and techniques may be used. Accordingly, it is submitted that that scope of the patent should not be limited to the described implementations but rather should be limited only by the spirit and scope of the following claims.

What is claimed is:

1. A method of error suppression, the method comprising:
in a first level, encoding a quantum state of a logical qubit using a passive quantum error-suppressing code to generate an encoded quantum state; and
in a second level, encoding the encoded quantum state using an active quantum error-correcting code;
wherein performing the encoding in the first level suppresses an effective error rate seen by the encoding in the second level.

2. The method according to claim 1, wherein the passive quantum error-suppressing code comprises a code having distance two.

3. The method according to claim 1, wherein the active quantum error-correcting code comprises a code having distance at least three.

4. The method according to claim 1, wherein the logical qubit comprises a plurality of physical qubits, the method further comprising the plurality of physical qubits interacting according to check operators of the passive quantum error-suppressing code with a negative coefficient, whereby introduction of a logical error by local physical noise requires an environmental energy greater than the interaction strength between at least two physical qubits.

5. The method according to claim 1, further comprising the logical qubit interacting, in the first level, with other logical qubits using a respective inductive coupling site, of the logical qubit, according to a four-physical-qubit operator.

6. The method according to claim 5, wherein each respective interaction comprises:
coupling, to a multispin interaction resonator, an inductive coupling site of the logical qubit;
coupling, to the multispin interaction resonator, an inductive coupling site of a logical qubit in the plurality of other logical qubits; and
modulating the inductive coupling sites at a frequency near that of the resonator.

7. The method according to claim 6, further comprising concatenating the logical qubit and the plurality of other logical qubits in the first level to form a logical qubit in the second level, wherein the active quantum error-correcting code in the second level is implemented by logical gate operation comprising the modulations of the logical qubit interacting with the other logical qubits according to the suppressed effective error rate.

8. A device comprising a logical qubit having a quantum state that has been encoded, in a first level, according to a passive quantum error-suppressing code to generate an encoded quantum state, the encoded quantum state having been further encoded, in a second level, according to an active quantum error-correcting code, wherein the encoding in the first level suppresses an effective error rate seen by the encoding in the second level.

9. The device according to claim 8, wherein the passive quantum error-suppressing code comprises a code having distance two.

10. The device according to claim 8, wherein the active quantum error-correcting code comprises a code having distance at least three.

11. The device according to claim 8, wherein the logical qubit comprises a plurality of physical qubits interacting according to check operators of the passive quantum error-suppressing code with a negative coefficient, whereby introduction of a logical error by local physical noise requires an environmental energy greater than the interaction strength.

12. The device according to claim 8, further comprising a plurality of other logical qubits, wherein the logical qubit and each of the plurality of other logical qubits are coupled by respective inductive coupling sites.

13. The device according to claim 12, wherein the respective inductive coupling sites are modulated according to a pulse to cause the logical qubit and the respective other logical qubit to interact in the first level.

14. The device according to claim 13, wherein the logical qubit and the plurality of other logical qubits in the first level are concatenated to form a logical qubit in the second level, wherein the active quantum error-correcting code in the second level is implemented by the modulations of the logical qubit interacting with the other logical qubits according to the suppressed effective error rate.

15. An error suppression device comprising:
first means for encoding in a first level a quantum state of a logical qubit using a passive quantum error-suppressing code to generate an encoded quantum state; and
second means for encoding in a second level the encoded quantum state using an active quantum error-correcting code;
wherein performing the encoding in the first level suppresses an effective error rate seen by the encoding in the second level.

16. The device of claim 15, wherein the passive quantum error-suppressing code comprises a code having distance two.

17. The device of claim 15, wherein the active quantum error-correcting code comprises a code having distance at least three.

18. The device of claim 15, wherein the logical qubit comprises a plurality of physical qubits, the device further comprising the plurality of physical qubits interacting according to check operators of the passive quantum error-suppressing code with a negative coefficient, whereby introduction of a logical error by local physical noise requires an environmental energy greater than the interaction strength between at least two physical qubits.

19. The device of claim 15 wherein:
the first means is provided as a logical qubit having a quantum state that has been encoded, in a first level, according to a passive quantum error-suppressing code to generate an encoded quantum state; and
the second means is provided as an active quantum error-correcting code, with the first and second means interacting such that the encoding in the first level suppresses an effective error rate seen by the encoding in the second level.

* * * * *